(12) United States Patent
Darbari (10) Patent No.: US 10,108,768 B2
(45) Date of Patent: Oct. 23, 2018

(54) IDENTIFYING BUGS IN A COUNTER USING FORMAL

(71) Applicant: Imagination Technologies Limited, Kings Langley (GB)

(72) Inventor: Ashish Darbari, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 29 days.

(21) Appl. No.: 15/340,816

(22) Filed: Nov. 1, 2016

(65) Prior Publication Data

US 2017/0220707 A1     Aug. 3, 2017

(30) Foreign Application Priority Data

Jan. 29, 2016  (GB) .................................. 1601719.6

(51) Int. Cl.
*G06F 17/00* (2006.01)
*G06F 17/50* (2006.01)

(52) U.S. Cl.
CPC ........ *G06F 17/504* (2013.01); *G06F 2217/06* (2013.01); *G06F 2217/12* (2013.01)

(58) Field of Classification Search
USPC ......................................................... 716/106
See application file for complete search history.

(56) References Cited

U.S. PATENT DOCUMENTS

| | | | | |
|---|---|---|---|---|
| 7,593,914 | B2* | 9/2009 | Fry ...................... | G05B 13/027 706/62 |
| 8,381,148 | B1* | 2/2013 | Loh ...................... | G06F 17/505 703/16 |
| 8,910,099 | B1 | 12/2014 | Goyal et al. | |
| 9,021,409 | B2* | 4/2015 | Vasudevan ............ | G06F 17/504 716/106 |
| 2012/0278774 | A1 | 11/2012 | Paruthi et al. | |
| 2013/0019216 | A1* | 1/2013 | Vasudevan ............ | G06F 17/504 716/106 |
| 2013/0290918 | A1* | 10/2013 | Baumgartner ........ | G06F 17/505 716/104 |

(Continued)

FOREIGN PATENT DOCUMENTS

EP       1 933 245 A1      6/2008

OTHER PUBLICATIONS

Sheeran et al; "Checking safety properties using induction and a SAT-Solver"; Electronic Publishing, Artistic Imaging, and Digital Typography; Nov. 1, 2000; pp. 108-125.

(Continued)

*Primary Examiner* — Mohammed Alam
(74) *Attorney, Agent, or Firm* — Vorys, Sater, Seymour and Pease LLP; Vincent M DeLuca (57) ABSTRACT

A method of detecting a bug in a counter of a hardware design that includes formally verifying, using a formal verification tool, an inductive assertion from a non-reset state of an instantiation of the hardware design. The inductive assertion establishes a relationship between the counter and a test bench counter at two or more points in time. If the formal verification tool identifies at least one valid state of an instantiation of the counter in which the inductive assertion is not true, information is output indicating a location of a bug in the hardware design or the test bench counter.

17 Claims, 5 Drawing Sheets

(56) References Cited

U.S. PATENT DOCUMENTS

2015/0213167 A1* 7/2015 Jain .................... G06F 17/5081
716/106

OTHER PUBLICATIONS

McFarland; "Formal Verification of Sequential Hardware: A Tutorial"; IEEE Transactions on Computer-Aided Design of Integrated Circuits and Systems; vol. 12; No. 5; May 1, 1993; pp. 633-654.
Djemal et al. "A novel formal verification approach for RTL hardware IP cores," Computer Standards and Interfaces, Jan. 6, 2005, Elsevier Sequoia. Lausanne, CH, vol. 27, pp. 637-651.

* cited by examiner

IDENTIFYING BUGS IN A COUNTER USING FORMAL

BACKGROUND

An integrated circuit is not typically implemented in hardware (e.g. silicon) until the hardware design for the integrated circuit is verified because post-silicon error discovery can be costly.

As is known to those of skill in the art there are several methods for verifying a hardware design including simulation based verification (also referred to as dynamic verification) and formal verification. The main difference between simulation based verification and formal verification is that simulation based verification is input-based (e.g. the test engineer supplies the test input signals) and formal verification is output-based (e.g. the test engineer provides the output properties to be verified).

In formal verification, the hardware design is transformed into a mathematical model (e.g. a state-transition system) and the properties to be verified are expressed using mathematical logic using a precise syntax or a language with a precise mathematical syntax and semantics. A property is then verified by searching the entire reachable state space of the hardware design without explicitly traversing the state machine. Since formal verification algorithmically and exhaustively explores all input values over time, verifying properties in this manner allows a property to be exhaustively proved or disproved for all states.

Many integrated circuits, such as system-on-chips (SoCs) implement one or more counters. Accordingly, verifying such hardware designs includes verifying the operation of the counter(s) in the hardware design. However, when the counter is large (e.g. sixteen bits or more) exhaustive verification through simulation-based verification or known formal verification methods becomes infeasible due to the large number of possible combinations.

The embodiments described below are provided by way of example only and are not limiting of implementations which solve any or all of the disadvantages of known methods for verifying the operation of a counter in a hardware design.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of detecting a bug in a counter of a hardware design is described herein that includes formally verifying, using a formal verification tool, an inductive assertion from a non-reset state of an instantiation of the hardware design. The inductive assertion establishes a relationship between the counter and a test bench counter at two or more points in time. If the formal verification tool identifies at least one valid state of the counter in which the inductive assertion is not true, information is output indicating a location of a bug in the counter or the test bench counter.

A first aspect provides a computer-implemented method of detecting a bug in a counter of a hardware design, the method comprising: receiving the hardware design, a test bench counter designed to simulate the counter, and an inductive assertion establishing a relationship between the counter and the test bench counter at two or more points in time; formally verifying, using a formal verification tool, the inductive assertion for the counter starting from a non-reset state of the counter; and in response to the formal verification tool identifying at least one valid state of the counter in which the inductive assertion is not true, outputting information indicating a location of a bug in the counter or the test bench counter.

A second aspect provides a system to detect a bug in a counter of a hardware design, the system comprising: a memory configured to store a test bench counter designed to simulate the counter; an inductive assertion establishing a relationship between the counter and the test bench counter at two or more points in time; the hardware design; and a formal verification tool; and one or more processors configured to: formally verify, using the formal verification tool, the inductive assertion for the counter starting from a non-reset state of the counter; and in response to the formal verification tool identifying at least one valid state of the counter in which the inductive assertion is not true, output information indicating a location of a bug in the counter or the test bench counter.

A third aspect provides a computer readable code adapted to perform the steps of the method of the first aspect when the code is run on a computer.

A fourth aspect provides a computer readable storage medium having encoded thereon the computer readable code of the third aspect.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described, by way of example, with reference to the following drawings, in which.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, many integrated circuits, such as system-on-chips (SoCs), implement one or more counters. The counters may be used for a variety of purposes. For example, a SoC may have a counter for keeping track of DDR-RAM (double data rate synchronous dynamic random-access memory) statistics and/or a counter for keeping track of the number of interrupts.

The size of a counter is based on the number of bits used to store the counter value. For an example, a counter that uses x bits to store the counter value is said to be a counter of size x bits, or an x bit counter. The size of the counter, x, determines the maximum value of the counter ($2^x-1$) and the total number of possible values of the counter ($2^x$). For example a sixteen bit counter can store 65,536 different values up to a maximum value of 65,535; and a sixty-four bit counter can store 18,446,744,073,709,551,616 different values up to a maximum value of 18,446,744,073,709,551,615.

Exhaustively verifying the operation of a counter (even one of a relatively small size (e.g. a fifteen bit counter or smaller)) through simulation-based verification often becomes completely infeasible due to the large number of input values to be tested. Methods have been successfully developed to exhaustively verify a counter by formally verifying a non-inductive assertion that establishes the equivalence of the counter and a test bench counter (i.e. a piece of code that simulates the desired operation of the counter). Such formal verification methods have been able to verify the operation of a five hundred and twelve bit counter, where there are no bugs in the counter, in the order of several minutes. However, these formal verification methods do not scale very well for large counters (e.g. sixteen bit counters or greater) where there is a bug in the counter or the test bench counter.

The inventor has identified that bugs in large counters can be quickly and efficiently identified by formally verifying an inductive assertion that establishes a relationship between the counter and the test bench counter from a non-reset state of the counter (i.e. not forcing the formal verification to start from a reset state). As is known to those of skill in the art, an inductive assertion is an assertion that relates two or more points in time. In other words, an inductive assertion specifies conditions at two or more points in time.

Formally verifying an inductive assertion from a non-reset state of an instantiation of the hardware design using a formal verification tool forces the formal verification tool to focus its checking in the vicinity of a bug in the hardware design. In particular, if a formal verification tool is configured to start the formal verification of an inductive assertion from a non-reset state of an instantiation of the hardware design, the formal verification tool selects a state in which the first condition in the inductive assertion is true and starts the verification from that state. Starting the formal verification from a state in which the first condition is true decreases the time to identify a bug. This is because automatic formal verification tools, such as, but not limited to, model checkers, are designed to work backwards on the structure of the Boolean formula to try to find a satisfying assignment of values to signal names in the Boolean formula.

In particular, when a formal verification tool is verifying an assertion (including inductive assertions and non-inductive assertions) the formal verification tool first negates the assertion to give a Boolean formula. A conjunction of this is then applied to the hardware design model (i.e. instantiation of the hardware design) and any formal constraints (discussed below). The formal verification tool then passes the resulting Boolean formula onto a satisfiability checking tool (SAT solver).

The SAT solver determines whether it is possible to make the Boolean formula true, and if so, identify a satisfying assignment of Boolean values to variables (signals) in this formula. If a satisfying assignment of Boolean values to variables is identified the negation of the original assertion (which was coded as a Boolean formula) is true or else the conjunction as a whole would not have been true. This implies that the assertion itself is false as its negation is true as well as the conjunction of the hardware design model (i.e. instantiation of the hardware design) and associated constraints.

The satisfying Boolean assignment is an example trace indicating that there may be a problem in the inductive assertion. The problem may be that the inductive assertion itself is incorrect i.e., the inductive assertion does not represent the desired behavior of the hardware design; that the property is not formalised correctly; or that the hardware design model (i.e. instantiation of the hardware design) and/or the constraints have a bug.

If the SAT solver determined there was no satisfying Boolean assignment then it is not possible to make the encoded Boolean formula true and thus the negation of the assertion is false and as a result the assertion itself is valid (or has been successfully verified).

Accordingly, formally verifying an inductive assertion from a non-reset state of an instantiation of the hardware design constrains the search by the formal verification tool to within the vicinity of the bug which allows the formal verification tool freedom to optimise the state space search.

A bug identified through formal verification of the inductive assertion can then be corrected and formal verification of the inductive assertion performed again until the inductive assertion is determined to be valid (i.e. successfully verified). Once the inductive assertion has been successfully verified (indicating all bugs in the counter and test bench counter have likely been corrected) then the operation of the counter in the hardware design may be formally verified using a non-inductive assertion.

Accordingly, embodiments described herein relate to methods and systems for identifying bugs in a counter of a hardware design through formal verification of an inductive assertion that establishes a relationship between the counter and the test bench counter at two or more points in time. In some examples, after the inductive assertion has been successfully verified (indicating the counter and the test bench counter are likely bug free) the operation of the counter may be exhaustively verified by formally verifying a non-inductive assertion.

Figure 1:
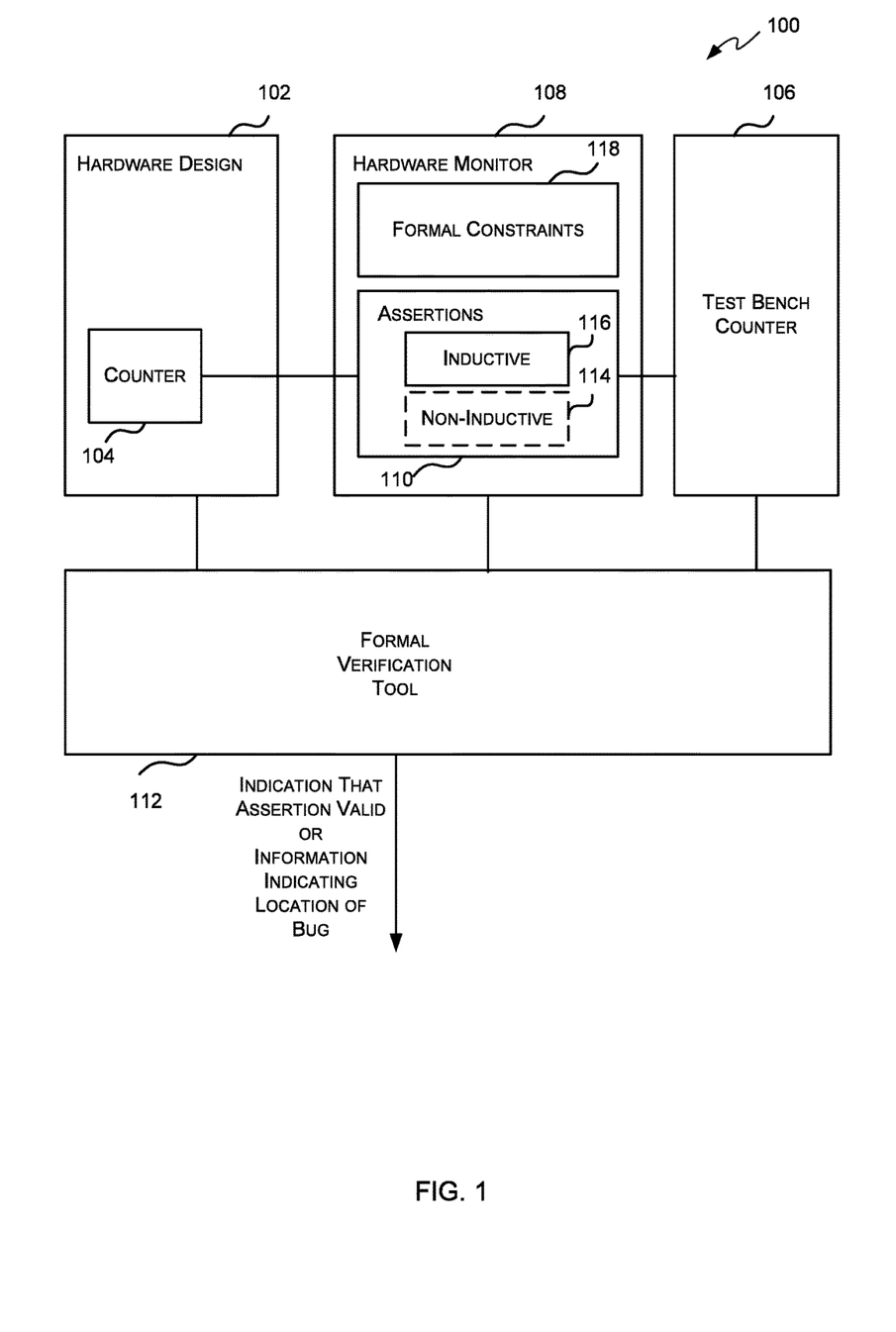
FIG. 1 is a block diagram of an example system for identifying bugs in a counter in a hardware design.

Reference is now made to FIG. 1 which illustrates an example system 100 for identifying bugs in a counter in a hardware design. The system 100 comprises a hardware design 102 for an integrated circuit that implements a counter 104; a test bench counter 106 that simulates the desired behavior of the counter 104; a hardware monitor 108 for monitoring the status of the counter 104 and the test bench counter 106; one or more assertions 110 which are used to determine whether the counter 104 is operating as desired; and a formal verification tool 112 configured to use the hardware monitor 108 and assertions 110 to identify bugs in the counter 104.

The term "hardware design" is used herein to refer to a description of an integrated circuit for all or part of an electronic system (e.g. a processor) which can be used to generate a hardware manifestation of the integrated circuit (e.g. the hardware design may be synthesised into silicon or used to program a field-programmable gate array (FPGA)). The hardware design may relate to a module, block, unit, sub-system, system or any combination thereof of the electronic system (e.g. processor).

The hardware design 102 may be implemented in a high level hardware description language (HDL), such as, but not limited to, a register transfer language (RTL). Examples of register transfer languages include, but are not limited to, VHDL (VHSIC Hardware Description Language) and Verilog. It will be evident to a person of skill in the art that other high level hardware description languages may be used such as proprietary high level hardware description languages.

An "instantiation of the hardware design" refers to a representation of the hardware defined by the hardware design. An instantiation of the hardware design embodies the hardware design in a form which can be tested to verify the hardware design. An instantiation of a hardware design includes, but is not limited to, a synthesized version of the hardware design, a hardware implementation of the hardware design (e.g. an integrated circuit made according to the hardware design), and a mathematical model (e.g. a state-transition system) generated by a formal verification tool.

The hardware design 102 of FIG. 1 describes or defines an integrated circuit implementing a counter 104. The counter 104 may be used for any purpose. For example, as described above, the counter 104 may be used to keep track of DDR-RAM statistics or the number of interrupts. The counter 104 is generally configured to increment or decrement a register value representing the current count upon certain events occurring.

The following is example RTL code for implementing a basic counter:

```
if resetn
    c <= 'h0;
if (update_condition)
    c <= c + inc - dec;
else if (clear_condition)
    c <= 'h0;
```

In this example, the register c is set to zero after a reset (resetn) or after a clear condition (clear_condition). If an update condition (update_condition) occurs, the register c is incremented by inc and decremented by dec.

While the exemplary hardware design 102 of FIG. 1 comprises a single counter 104 it will be evident to a person of skill in the art that the methods and principles described herein can be equally applied to hardware designs describing integrated circuits with more than one counter.

The test bench counter 106 is a software module that simulates the desired behavior of the counter 104. The test bench counter 106 is developed from the specification for the counter 104 which sets out the desired operation of the counter. For example, the specification for the counter 104 may indicate that the counter 104 should increment the count value by x when it receives signal a, and it should decrement the count value by y when it receives signal b. A test bench counter for that counter would be configured to receive signals a and b and increment the count value by x when signal a is received, and decrement the count value by y when signal b is received.

The test bench counter 106 may be implemented in a hardware description language (HDL), such as Verilog or VHDL, or an assertion language (which may also be referred to as a property language), such as System Verilog (SV). Assertion languages are discussed in more detail below in relation to the assertions 110.

The hardware monitor 108 is a module configured to monitor the current values of an instantiation of the counter 104 (e.g. via an instantiation of the hardware design) and the test bench counter 106. The hardware monitor 108 may be implemented in software. For example, the hardware monitor 108 may be implemented using a hardware description language (HDL) or an assertion language (e.g. System Verilog (SV)).

The hardware monitor 108 is bound to the hardware design 102 and the test bench counter 106 to monitor the values of an instantiation of the counter 104 and the test bench counter 106. Where the hardware monitor 108 is implemented in SV and the hardware design 102 is implemented in RTL, the SV code is bound to the RTL code.

The one or more assertions 110 are executable statements that assert a certain property must be true. If an asserted property is not true at any valid point in time then the assertion is not valid.

As is known to those of skill in the art, a property is a statement or expression that captures design behavior. For example, a simple property may be a=b. Within HDL designs, a property is an executable statement that checks for specific behavior within the HDL design. For example, if a design contains a FIFO (first in first out) buffer a property may be that neither overflow nor underflow of the FIFO may occur.

Properties are used to capture required or desired temporal behavior of an instantiation of the hardware design in a formal and unambiguous way. The hardware design can then be verified to determine that it conforms to the required or desired behavior as captured by one or more properties.

Properties are typically written in an assertion language. An assertion language, which also may be referred to as a property language, captures the design behavior over multiple design cycles in a concise, unambiguous manner. While traditional hardware description languages (HDL), such as Verilog RTL, have the ability to capture individual cycle behavior, they are too detailed to describe properties at a higher level. In particular, assertion languages provide means to express temporal relationships and complex design behaviors in a concise manner. Assertion languages include, but are not limited to, SystemVerilog (SV), Property Specification Language (PSL), Incisive® Assertion Library (IAL), Synopsys® OpenVera™ Assertions (OVA), Symbolic Trajectory Evaluation (STE), Hardware Property Language (HPL), 0-In®, and Open Verification Library (OVL).

A property may be asserted or covered. When a property is asserted it must always be true. In contrast, when a property is covered the property must be true at least once, but is not required to be true always. An asserted property is said to form an assertion. An example assertion of the property a=b is assert property a=b. Similarly a covered property is said to form a cover. An example cover of the property a=b is cover property a=b.

Properties are typically 'clocked', meaning that that they are only evaluated upon a clock event occurring (e.g. upon the positive edge of a clock signal or the negative edge of a clock signal). Accordingly, assumptions or covers generally indicate which clock and which clock edge triggers evaluation of the property. An example SV assertion of the property a=b is as follows:

```
always @ posedge clk
   assert property a==b;
```

It will be evident to a person of skill in the art that in the example SV assertion above the property a==b will be evaluated on the positive edge (posedge) of the clock signal (clk).

In the system of FIG. 1 the assertions 110 comprise at least one inductive assertion 116. As is known to those of skill in the art, an inductive assertion 116 relates two or more points in time. In other words, an inductive assertion specifies conditions at two or more points in time. For example, an inductive assertion may assert if condition X is true then in the next clock cycle condition Y is true. However, it will be evident to a person of skill in the art that this is an example only and other inductive assertions may relate consecutive or non-consecutive points in time and/or more than two points in time. An inductive assertion can be contrasted with a non-inductive assertion which specifies a single point in time. For example, a non-inductive assertion may assert condition X is true (for all valid points in time) and not specify a more fine-grained relationship between two or more points in time.

In the embodiments described herein the inductive assertion 116 establishes a relationship between the counter 104 and the test bench counter 106 at two or more points in time.

In some examples, the inductive assertion 116 is used to establish that the counter 104 in the hardware design 102 is sequentially equivalent to the test bench counter 106. For example, the inductive assertion 116 may assert that if the value of the counter 104 is equal to the value of the test bench counter 106 then in the next clock cycle the value of the counter 104 is equal to the value of the test bench counter 106.

An example SV inductive assertion asserting such a property is provided below where counter_hd is the value of an instantiation of the counter 104 and counter_tb is the value of the test bench counter 106:

```
assert property counter_hd == counter_tb |=>
   counter_hd == counter_tb;
```

As will be evident to those of skill in the art, the above example assertion asserts that if the instantiation of the counter (counter_hd) is equal to the test bench counter (counter_tb) then in the next clock cycle (|=>) the instantiation of the counter (counter_hd) is equal to the test bench counter (counter_tb).

The inductive assertion 116 is used to quickly and efficiently identify bugs in the counter 104.

In some examples, after the inductive assertion 116 has been formally verified (indicating there are likely no bugs in the counter 104) a non-inductive assertion 114 is used to exhaustively verify the operation of the counter 104.

In some examples, the non-inductive assertion 114 is used to establish that the counter 104 is equivalent to the test bench counter 106. For example, the non-inductive assertion 114 may assert that the value of the counter 104 is equal to the value of the test bench counter 106.

An example SV non-inductive assertion asserting such a property is provided below where counter_hd is the value of an instantiation of the counter 104 and counter_tb is the value of the test bench counter 106:
   assert property counter_hd==counter_tb;

As will be evident to those of skill in the art, the above assertion states that the hardware design counter (counter_hd) is equal to the test bench counter (counter_tb).

Such an assertion can be used to exhaustively verify, through formal verification, the operation of some counters. However, this formal verification method does not scale very well for large counters (e.g. sixteen-bit counters or larger) especially where there is a bug in the counter 104 or the test bench counter 106.

Accordingly, by first identifying bugs in the counter using the inductive assertion 116, the non-inductive assertion 114 can be used to exhaustively verify the operation of the counter 104, even when the counter is large.

The assertions 110 may form part of, or be integrated with, the hardware monitor 108 as shown in FIG. 1 or they may be bound to the hardware monitor 108.

The system 100 may also include one or more formal constraints 118 which define the valid inputs or states of the counter 104. Because a property is an alternative way of expressing part of a design, a failure can be caused by unintended input or state configurations. To remove unintended configurations from interfering with the property verifications formal constraints may be developed to constrain the inputs or states to valid inputs or states.

The hardware design 102 (e.g. RTL), hardware monitor 108 (e.g. SV), assertions 110 (e.g. SV), test bench counter 106, formal constraints 118 and bindings, are loaded into a formal verification tool 112. The formal verification tool 112 is a software tool that is capable of performing formal verification of a hardware design. Examples of formal verification tools include, but not limited to OneSpin 360 DV™, Cadence® Incisive® Enterprise Verifier, and Jasper-Gold®.

Formal verification is a systematic process that uses mathematical reasoning to verify a property in a hardware design. Formal verification can be contrasted to simulation-based verification in which a hardware design is tested by applying stimuli to the hardware design and monitoring the output of the hardware design in response to the stimuli.

In formal verification the hardware design (e.g. hardware design 102) is transformed into a mathematical model (e.g. a state-transition system) to thereby provide an instantiation of the hardware design which can be tested to verify the hardware design, and the properties (e.g. those asserted by assertions 110) are expressed using mathematical logic using a precise syntax or a language with a precise mathematical syntax and semantics.

A property is verified by searching the entire reachable state space of an instantiation of the hardware design (e.g. state transition system) without explicitly traversing the state machine. The search is done by, for example, encoding the states using efficient Boolean encodings using Binary decision diagrams (BDDS), or using advanced SAT (satisfiability-based bounded model checking) based techniques. In some cases tools can be used to implement techniques, such as, but not limited to, abstraction, symmetry, symbolic indexing, and invariants to improve performance and achieve scalability.

A property that is covered is verified by searching the reachable state space of the instantiation of the hardware design (e.g. state transition system) for at least one valid state in which the property is true. Once a valid state is found in which the property is true then the searching ceases. In contrast, a property that is asserted is verified by confirming the property is true for all valid states (as defined by the formal constraints 118). In other words, an asserted property is verified by searching the reachable state space of the instantiation of the hardware design for a valid state in which the property is not true. Since formal verification of an asserted property algorithmically and exhaustively explores all valid input values over time, verifying an asserted property in this manner allows a property to be exhaustively proved or disproved for all valid states.

When the formal verification tool 112 is used to verify an assertion, the formal verification tool 112 may output an indication of whether or not the assertion is valid (i.e. is true for all valid states), which may also be referred to herein as the assertion being successfully verified. The output may be yes the assertion is valid or has been successfully verified; no the assertion is not valid (i.e. it is not true or has failed for at least one valid state) or has not been successfully verified; or the formal verification was inconclusive. The formal verification may be inconclusive, for example, because the computing-based device running the formal verification tool 112 has run out of memory or because the formal verification tool 112 has determined that a certain amount of progress has not been made after a predefined period of time.

Where an assertion is not valid or has not been successfully verified, the formal verification tool outputs information indicating the location of a bug in the counter 104 or the test bench counter 106. For example, the formal verification tool may output a trace of the verification indicating at what point or state the failure occurred which indicates the location of a bug in the counter 104 or the test bench counter 106.

Where, for example, the inductive assertion asserts that if the value of an instantiation of the counter 104 is equal to the value of the test bench counter 106 then in the next clock cycle the value of the instantiation of the counter 104 is equal to the value of the test bench counter 106, then the trace output by the formal verification tool 112 may show the clock cycle in which the value of the instantiation of the counter 104 and the test bench counter 106 are the same and the clock cycle in which the value of the instantiation of the counter 104 and the test bench counter 106 are different causing the inductive assertion to fail. Some verification tools break the assessment of an assertion into an evaluation phase and a result phase so that the tool does not actually stop with a failure until the clock cycle after the failure occurred. In these cases the trace may include information related to the cycle in which the verification was stopped.

If the formal verification tool 112 indicates that the inductive assertion is not valid (i.e. there is at least one state of the counter 104 in which the inductive assertion 116 is not true) or was not successfully verified then the hardware design 102 or the test bench counter 106 are modified using the output information and the formal verification of the inductive assertion 116 is repeated using the modified hardware design (i.e. modified counter 104) or modified test bench counter 106.

Once the inductive assertion 116 has been successfully verified by the formal verification tool 112 it is likely that any bugs in the counter 104 (i.e. any bugs in the portion of the hardware design 102 that defines the counter 104) and the test bench counter 106 have been corrected. As a result, the counter 104 can be exhaustively verified by formal verification of a non-inductive assertion. This allows large counters (e.g. sixteen-bit counters or greater) to be exhaustively verified in a quick and efficient manner even when there is a bug or error in the counter being verified.

In some examples, the formal verification of the non-inductive assertion may be improved by assuming the property of the inductive assertion. A property that is assumed is, as its name suggests, assumed to be true thus does not have to be verified. This can significantly improve the speed at which the formal verification tool formally verifies the non-inductive assertion since it significantly reduces the number of states the formal verification tool 110 has to check. The property of the inductive assertion can only be assumed to be true if it has already been formally verified. This will be discussed in more detail in reference to FIG. 3.

Figure 2:
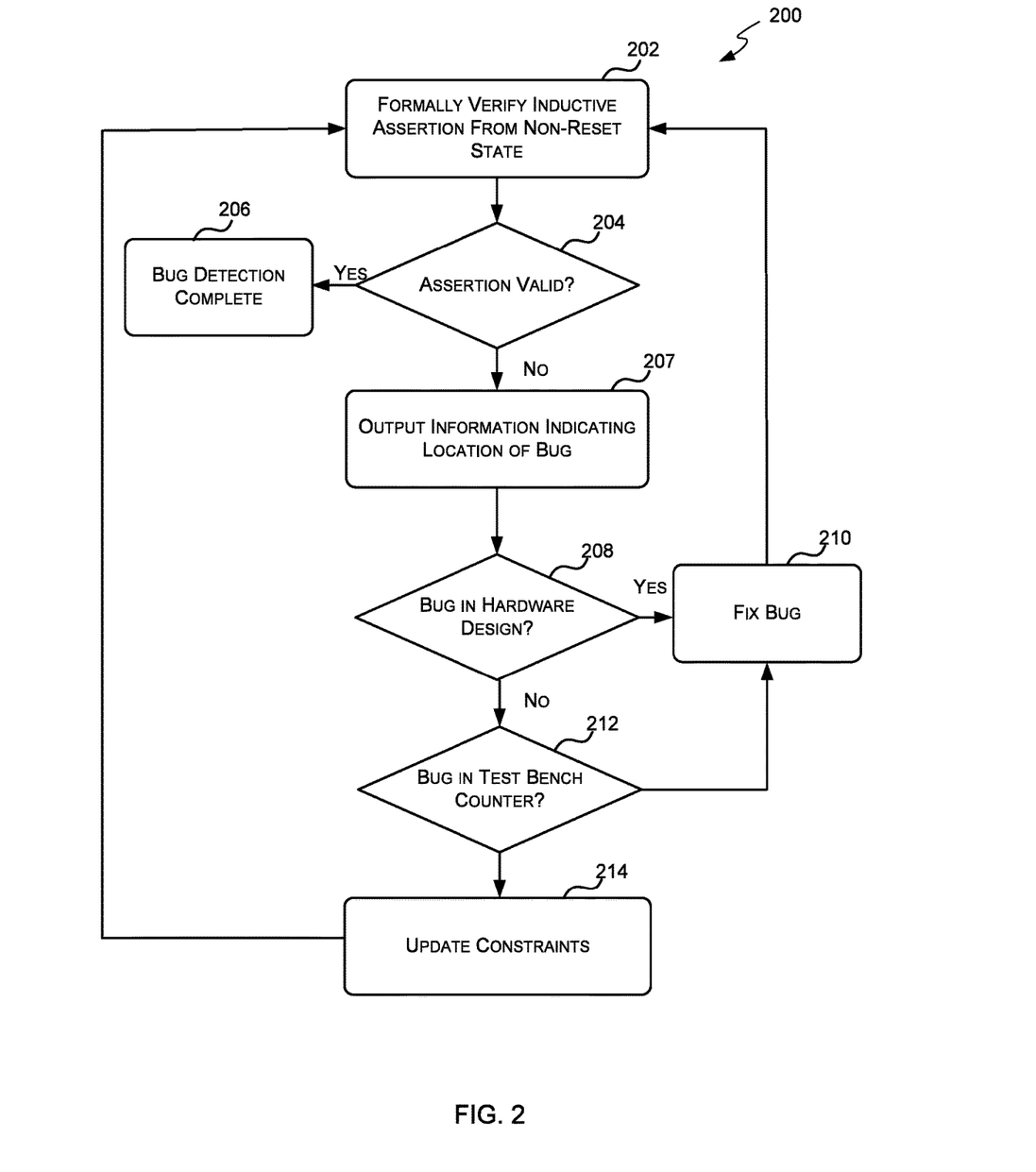
FIG. 2 is a flow diagram of an example method for identifying bugs in a counter in a hardware design using the system of FIG. 1.

Reference is now made to FIG. 2 which illustrates a flow diagram of an example method 200 for identifying bugs in a counter 104 in a hardware design 102 using the system 100 of FIG. 1. The method 200 may be implemented on a computing-based device, such as the computing-based device 400 described below with reference to FIG. 4.

The method 200 begins at block 202 where the formal verification tool 112 formally verifies the inductive assertion 116 from a non-reset state of an instantiation of the counter 104. As described above, the inductive assertion 116 establishes a relationship between the counter 104 and the test bench counter 106 for two or more points in time.

For example, the inductive assertion 116 may assert that if the value of an instantiation of the counter 104 and the value of the test bench counter 106 are the same in a particular clock cycle then in the next clock cycle the value of the instantiation of the counter 104 and the value of the test bench counter 106 are the same. Accordingly, the inductive assertion 116 can be thought of as, if condition X is true then in the next cycle condition Y must be true.

Formally verifying such an inductive assertion means verifying that for all valid states of the instantiation of the counter 104 (as defined by the formal constraints 118) where condition X is true that in the next clock cycle condition Y is true. As described above, if the formal verification tool 112 is configured to start the formal verification of a non-inductive assertion from a non-reset state of the instantiation of the counter 104 (and the test bench counter 106) the formal verification tool 112 selects a state in which condition X is true and starts the verification from that state. Starting the formal verification from a state in which condition X is true decreases the time to identify a bug. This is because formal verification tools are designed to work backwards on the structure of the Boolean formula to try to find a satisfying assignment of values to signal names in the Boolean formula. A satisfying assignment is a proof that there is a bug in the hardware design. Formally verifying an inductive assertion from a non-reset state of the instantiation of the hardware design therefore constrains the search by the formal verification tool to within the vicinity of the bug which allows the formal verification tool freedom to optimise the state space search.

A formal verification tool can be instructed to start formal verification from a known state or a state selected by the formal verification tool 112. As is known to those of skill in the art, a reset can be performed on an electronic device which sets the device back to a known "reset state". The term "non-reset state" is used herein to mean that the formal verification tool is not instructed to start the formal verification from the reset state, instead the formal verification tool 112 selects an arbitrary state to start from.

Once the formal verification ends, either because the inductive assertion is deemed to be true for all valid states of the instantiation of the counter 104 (as defined by the formal constraints 118) or because a valid state has been identified in which the inductive assertion 116 is not true or has failed, the method 200 proceeds to block 204.

At block 204, a determination is made whether the inductive assertion has been successfully verified (i.e. the formal verification tool has determined that the inductive assertion is true for all valid states of the instantiation of the counter 104) the method 200 proceeds to block 206. If, however, it is determined that the inductive assertion was not successfully verified (i.e. the formal verification tool identified at least one valid state of the instantiation of the counter 104 in which the inductive assertion is not true) then there is likely a bug in the portion of the hardware design 102 defining the counter 104 or a bug in the test bench counter 106 and the method 200 proceeds to block 207.

At block 207, information is output indicating the location of a bug in the hardware design 102 or the test bench counter 106. For example, the formal verification tool 112 may output a trace of the verification indicating at what point in time, or state of the instantiation of the counter 104, the failure occurred which indicates the location of a bug in the hardware design 102 or the location of a bug in the test bench counter 106. The method 200 then proceeds to block 208.

At block 208, the hardware design 102 is analyzed, based on the output information, to determine whether there is an error or bug in the hardware design 102 that caused the failure. If it is determined that there is an error or bug in the hardware design 102 that caused the failure then the method 200 proceeds to block 210 where the error or bug is corrected. The method 200 then proceeds back to block 202 where the inductive assertion is formally verified for the modified hardware design.

If, however, it is determined at block 208 that there is not a bug in the hardware design 102 that caused the failure then the method 200 proceeds to block 212.

At block 212, the test bench counter 106 is analyzed, based on the output information, to determine whether there is an error or bug in the test bench counter 106 that caused the failure. If it is determined that there is an error or bug in the test bench counter 106 then the method 200 proceeds to block 210 where the error or bug is corrected. The method 200 then proceeds back to block 202 where the inductive assertion is formally verified using the modified test bench counter 106.

If, however, it is determined at block 212 that there is not a bug in the test bench counter 106 that caused the failure then the method 200 proceeds to block 214.

At block 214, the formal constraints 118 under which the formal verification is run are updated. As described above, because a property is an alternative way of expressing part of a design a failure can be caused by unintended input or state configurations. To remove unintended configurations from interfering with the property verifications formal constraints may be developed to constrain the inputs or states to valid inputs or states. If the formal verification has failed then the failure may have been caused by a non-valid input or state. Accordingly, the formal constraints 118 may be updated, after which the method 200 proceeds back to block 202 where the inductive assertion is formally verified using the modified formal constraints 118.

Testing has shown that the method 200 is particularly effective in identifying very deep bugs (e.g. bugs that occur several billion, or quintillion, clock cycles after a starting state). Specifically, the method 200 has been able to identify deep bugs in large counters in a matter of seconds.

As described above, once the method 200 of FIG. 2 has been used to identify the bugs in the counter 104 (and the test bench counter 106), the counter 104 may be exhaustively verified using a non-inductive assertion 114.

Figure 3:
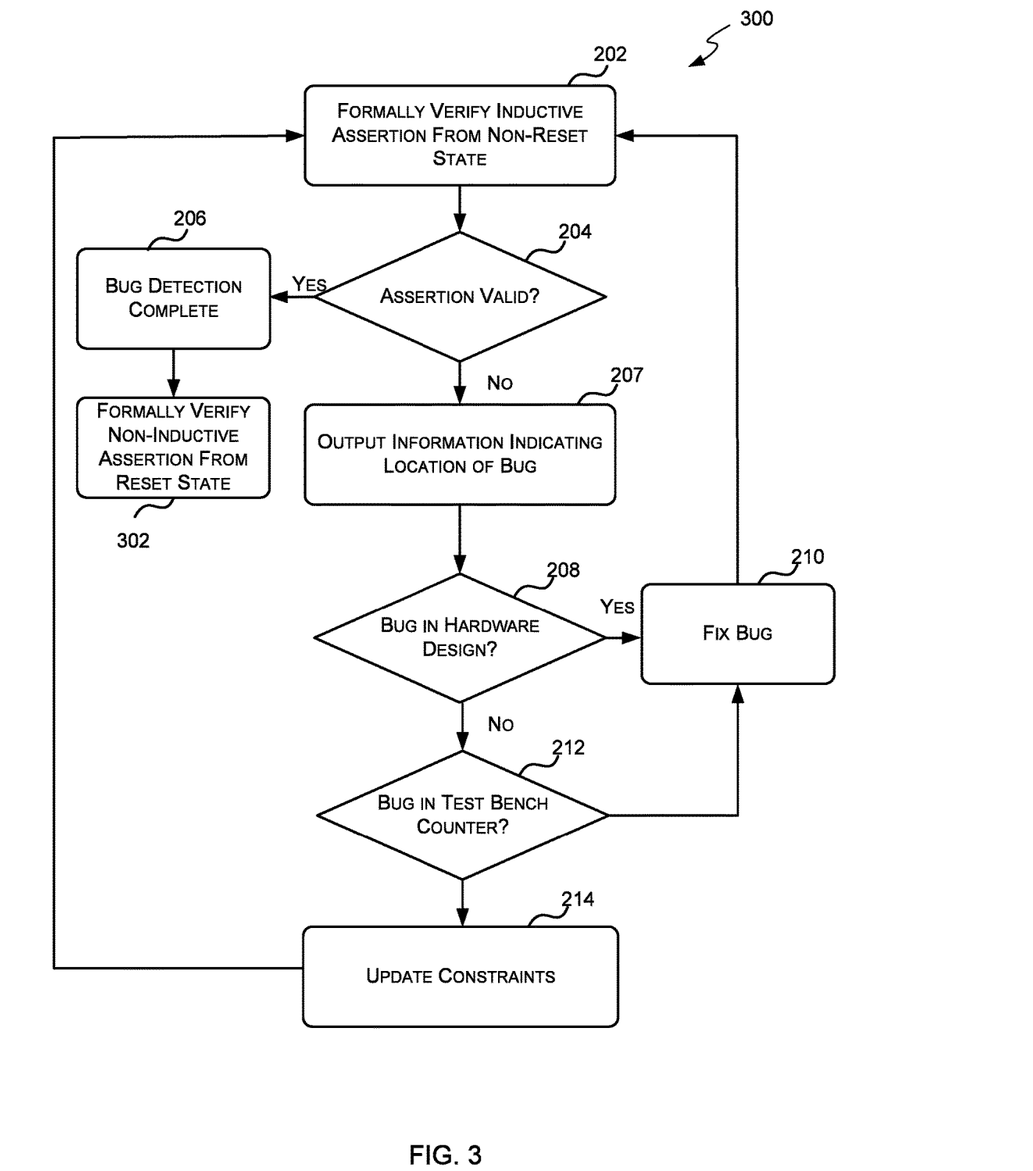
FIG. 3 is a flow diagram of an example method for exhaustively verifying a counter in a hardware design using the system of FIG. 1.

Reference is now made to FIG. 3 which illustrates an example method 300 for exhaustively verifying a counter 104 in a hardware design 102 using the system 100 of FIG. 1. The method 300 includes executing blocks 202 to 214 of the method 200 of FIG. 2 to detect bugs in the counter 104, and then after the bug detection is complete at block 206 the method 300 proceeds to block 302 where the non-inductive assertion 114 is verified for the counter 104 starting from a reset state (which is typically a requirement for exhaustive verification of a hardware design, but may not necessarily be required). Since the exhaustive verification is performed after bug correction it can be performed efficiently, even for large counters.

The method 300 may be further improved by assuming the inductive assertion property during the formal verification of the non-inductive assertion. If a property is assumed then the formal verification tool deduces that property to be valid and thus does not explicitly exercise the run for this property to verify the states for which the property holds. This significantly reduces the time to complete the formal verification as it allows the formal verification tool 112 to focus on the properties and the state-space that have not been checked.

In the method 300 of FIG. 3 the property of the inductive assertion can be assumed during formal verification of the non-inductive assertion since this property has already been verified during the bug identification phase (blocks 202 to 214) of the method 300.

If the inductive assertion 116 asserts that if the value of the instantiation of the counter 104 and the value of the test bench counter 106 are the same, then in the next clock cycle the value of the instantiation of the counter 104 and the value of the test bench counter 106 are the same, the following is an example SV assume statement that may be used during formal verification of the non-inductive assertion to assume the inductive assertion property:

```
assume property counter_hd == counter_tb |=>
    counter_hd == counter_tb;
```

Testing has shown that when the property of the inductive assertion 116 is assumed during formal verification of the non-inductive assertion a five hundred and twelve bit counter (which has more than $1.34 \times 10^{154}$ possible values) can be exhaustively verified using the method 300 of FIG. 3 in less than a minute.

Once the counter 104 has been exhaustively verified according to the method 300 of FIG. 3 (i.e. the formal verification of the non-inductive assertion being successful), an integrated circuit implementing the counter may be generated based on the hardware design. For example, the hardware design may be provided to an integrated manufacturing system which configures the integrated manufacturing system to generate an integrated circuit implementing the counter. An example integrated circuit manufacturing system will be described below with reference to FIG. 5.

Although the above examples describe using the hardware monitor 108 (including the inductive assertion 116) and test bench counter 106 to detect bugs in a counter 104 of a hardware design 102 by formally verifying the inductive assertion 116 using a formal verification tool 112, in other examples the hardware monitor 108 (including the non-inductive assertion 116) and the test bench counter 106 may be synthesised into hardware (e.g. an integrated circuit) as part of, or in connection with, the hardware design 102. In these examples the inductive assertion 116 acts as a monitor of the counter 104 during operation of the hardware. In particular, during operation of the hardware (e.g. integrated circuit) the hardware monitor 108 periodically evaluates the inductive assertion (e.g. upon the positive edge of the clock signal).

If the hardware monitor 108 detects that the inductive assertion 116 has failed or is not true then the hardware monitor 108 may output information indicating a failure and/or the location of a bug in the counter 104. This can improve observability by being able to identify bugs once they are triggered by specific stimuli (e.g. specific test vector(s) or input). Without such an assertion an error or a bug may only be identified in simulation-based verification or during operation if it propagates to an observable output and then it is only evident at the end of the simulation. By using an assertion, errors and bugs can be checked and observed instantly, at their source.

For example, the hardware monitor 108 may output a trace similar to that described above. In particular, where the inductive assertion asserts that if the value of the counter is the same as the value of the test bench counter then in the next clock cycle the value of the counter is the same as the value of the test bench counter, the hardware monitor may output a three-cycle trace which provides information on the clock cycle in which the value of the counter is the same as the value of the test bench counter, the next clock cycle in which the assertion failed (i.e. the clock cycle in which the value of counter is not the same as the value of the test bench counter), and the following clock cycle in which the failure was output. Such a three-cycle trace (compared to a significantly longer trace which may be generated through simulation) may help an engineer quickly identify the location of a bug in the counter, especially for deep bugs (e.g. bugs that occur several billion, or quintillion, clock cycles after a starting state).

The concepts described above in the context of identifying bugs in a counter in a hardware design, can be used to identify bugs in other components in a hardware design. In particular, there may be provided a system configured to detect a bug in a component of a hardware design, the system comprising: a memory configured to store: a test bench component designed to simulate the component of the hardware design; an inductive assertion establishing a relationship between the component of the hardware design and the test bench component at two or more points in time; the hardware design; and a formal verification tool; and one or more processors configured to: formally verify, using the formal verification tool, the inductive assertion for the component; and in response to the formal verification tool identifying at least one valid state of an instantiation of the component in which the inductive assertion is not true, output information indicating a location of a bug in the hardware design or the test bench component.

Figure 4:
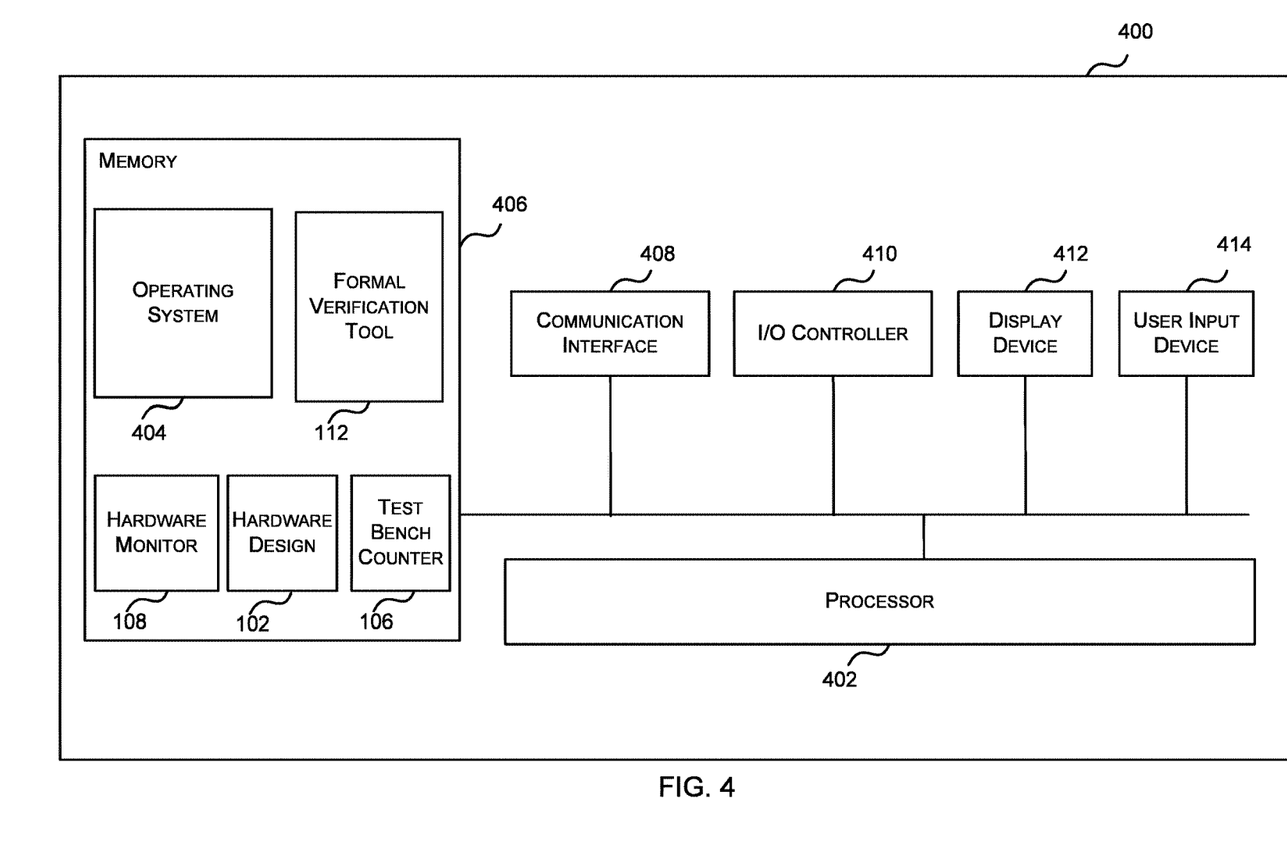
FIG. 4 is a block diagram of an example computing-based device.

FIG. 4 illustrates various components of an exemplary computing-based device 400 which may be implemented as any form of a computing and/or electronic device, and in which embodiments of the systems and method described herein may be implemented.

Computing-based device 400 comprises one or more processors 402 which may be microprocessors, controllers or any other suitable type of processors for processing computer executable instructions to control the operation of the device in order to identify bugs in a counter of a hardware design. In some examples, for example where a system on a chip architecture is used, the processors 402 may include one or more fixed function blocks (also referred to as accelerators) which implement a part of the method in hardware (rather than software or firmware). Platform software comprising an operating system 404 or any other suitable platform software may be provided at the computing-based device to enable application software, such as a formal verification tool 112, to be executed on the device.

The computer executable instructions may be provided using any computer-readable media that is accessible by computing based device 400. Computer-readable media may include, for example, computer storage media such as memory 406 and communications media. Computer storage media (i.e. non-transitory machine readable media), such as memory 406, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 406) is shown within the computing-based device 400 it will be appreciated that the storage may be distributed or located remotely and accessed via a network or other communication link (e.g. using communication interface 408).

The computing-based device 400 also comprises an input/output controller 410 arranged to output display information to a display device 412 which may be separate from or integral to the computing-based device 400. The display information may provide a graphical user interface. The input/output controller 410 is also arranged to receive and process input from one or more devices, such as a user input device 414 (e.g. a mouse or a keyboard). This user input may be used to initiate verification of one or more assertions 110. In an embodiment the display device 412 may also act as the user input device 414 if it is a touch sensitive display device. The input/output controller 410 may also output data to devices other than the display device, e.g. a locally connected printing device (not shown in FIG. 4).

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realise that such processing capabilities are incorporated into many different devices and therefore the term 'computer' includes set top boxes, media players, digital radios, PCs, servers, mobile telephones, personal digital assistants and many other devices.

Figure 5:
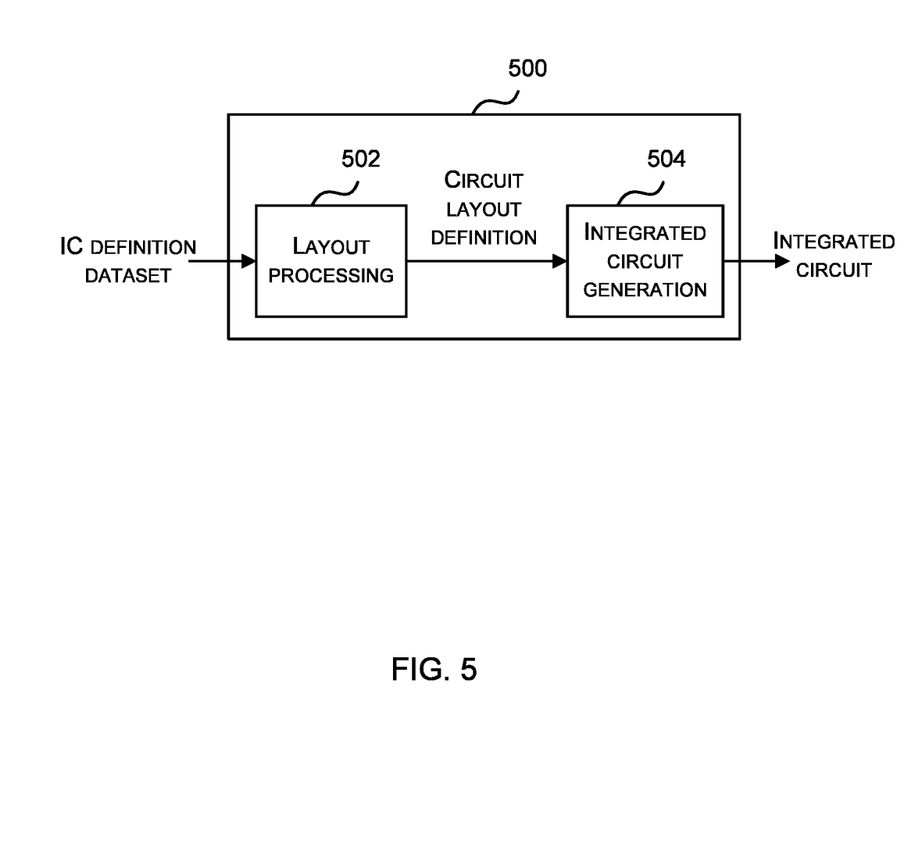
FIG. 5 is a block diagram of an example integrated circuit manufacturing system.

FIG. 5 shows an example of an integrated circuit (IC) manufacturing system 500 which comprises a layout processing system 502 and an integrated circuit generation system 504. The IC manufacturing system 500 is configured to receive an IC definition dataset (e.g. such as a hardware design 102 comprising a counter 104 as described in any of the examples herein), process the IC definition dataset, and generate an IC according to the IC definition dataset (e.g. which implements one or more counters as described in any of the examples herein). The processing of the IC definition dataset configures the IC manufacturing system 500 to manufacture an integrated circuit implementing one or more counters as described in any of the examples herein.

The layout processing system 502 is configured to receive and process the IC definition dataset (e.g. hardware design 102) to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 502 has determined the circuit layout it may output a circuit layout definition to the IC generation system 504. A circuit layout definition may be, for example, a circuit layout description.

The IC generation system 504 generates an IC according to the circuit layout definition, as is known in the art. For example, the IC generation system 504 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 504 may be in the form of computer-readable code which the IC generation system 504 can use to form a suitable mask for use in generating an IC.

The different processes performed by the IC manufacturing system 500 may be implemented all in one location, e.g. by one party. Alternatively, the IC manufacturing system 500 may be a distributed system such that some of the processes may be performed at different locations, and may be performed by different parties. For example, some of the stages of: (i) synthesising RTL code representing the IC definition dataset (e.g. hardware design 102) to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an integrated circuit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate an integrated circuit implementing one or more counters as described herein. For example, the configuration of an integrated circuit manufacturing system in the manner described above with respect to FIG. 5 by an integrated circuit manufacturing definition dataset may cause an integrated circuit implementing one or more counters as described herein to be manufactured.

In some examples, an integrated circuit definition dataset could include software which runs on hardware defined at the dataset or in combination with hardware defined at the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method of correcting a bug in a counter of a hardware design, the method comprising:
   (a) receiving, at one or more processors, the hardware design, a test bench counter designed to simulate the counter, and an inductive assertion establishing a relationship between the counter and the test bench counter at two or more points in time;
   (b) formally verifying at the one or more processors, using a formal verification tool, the inductive assertion for the counter starting from a non-reset state of an instantiation of the counter; and
   (c) in response to the formal verification tool identifying at least one valid state of the instantiation of the counter in which the inductive assertion is not true, outputting from the one or more processors information indicating a location of a bug in the hardware design or the test bench counter;
   (d) using the output information to determine whether there is a bug in the hardware design;
   (e) in response to determining that there is a bug in the hardware design, modifying the hardware design to correct the bug; and
   (f) formally verifying, at the one or more processors, the modified hardware design for implementation in hardware.

2. The method of claim 1, wherein the inductive assertion asserts that if a value of an instantiation of the counter is equal to a value of the test bench counter at a first point in time that the value of the instantiation of the counter is equal to the value of the test bench counter at a second point in time.

3. The method of claim 2, wherein the inductive assertion asserts that if the value of the instantiation of the counter is equal to the value of the test bench counter in a particular clock cycle that the value of the instantiation of counter is equal to the value of the test bench counter in a next clock cycle following the particular clock cycle.

4. A method of exhaustively verifying a counter of a hardware design, the method comprising:
performing the method as set forth in claim 1, wherein said formally verifying the modified hardware design comprises;
repeating (b) using the modified hardware design; and
in response to the formal verification tool determining the inductive assertion is true for all valid states of the instantiation of the counter, exhaustively verifying the counter by formally verifying, using the formal verification tool, a non-inductive assertion for the counter starting from a reset state of the instantiation of the counter, the non-inductive assertion establishing equivalence of the counter and the test bench counter.

5. The method of claim 4, wherein the non-inductive assertion asserts that the value of the instantiation of the counter is equal to the value of the test bench counter.

6. The method of claim 4, wherein the non-inductive assertion is formally verified under an assumption that the inductive assertion is valid.

7. A method of generating an integrated circuit, the method comprising:
performing the method as set forth in claim 4; and
in response to the formal verification tool determining the non-inductive assertion is true for all valid states of the instantiation of the counter, manufacturing an integrated circuit implementing the counter based on the hardware design.

8. The method of claim 1, wherein the hardware design, when processed in an integrated circuit manufacturing system, configures the integrated circuit manufacturing system to manufacture an integrated circuit implementing the counter.

9. A system for correcting a bug in a counter of a hardware design, the system comprising:
a memory configured to store:
a test bench counter designed to simulate the counter;
an inductive assertion establishing a relationship between the counter and the test bench counter at two or more points in time;
the hardware design; and
a formal verification tool; and
one or more processors configured to:
formally verify, using the formal verification tool, the inductive assertion for the counter starting from a non-reset state of an instantiation of the counter;
in response to the formal verification tool identifying at least one valid state of the instantiation of the counter in which the inductive assertion is not true, output information indicating a location of a bug in the hardware design or the test bench counter; and
if the output information indicates a location of a bug in the hardware design, receive a modified hardware design and formally verify the modified hardware design for implementation in hardware, wherein the modified hardware design is a version of the hardware design modified to correct the bug in accordance with the output information.

10. The system of claim 9, wherein the inductive assertion asserts that if a value of the instantiation of the counter is equal to a value of the test bench counter at a first point in time that the value of the instantiation of the counter is equal to the value of the test bench counter at a second point in time.

11. The system of claim 10, wherein the inductive assertion asserts that if the value of the instantiation of the counter is equal to the value of the test bench counter in a particular clock cycle that the value of the instantiation of the counter is equal to the value of the test bench counter in a next clock cycle following the particular clock cycle.

12. The system of claim 9, wherein the one or more processors is configured to formally verify the modified hardware design by:
formally verifying, using the formal verification tool, the inductive assertion using the modified hardware design; and
in response to the formal verification tool determining the inductive assertion is true for all valid states of the instantiation of the counter, exhaustively verifying the counter by formally verifying, using the formal verification tool, a non-inductive assertion for the counter starting from a reset state of the instantiation of the counter, the non-inductive assertion establishing equivalence of the counter and the test bench counter.

13. The system of claim 12, wherein the non-inductive assertion asserts that the value of the instantiation of the counter is equal to the value of the test bench counter.

14. The system of claim 12, wherein the one or more processors is configured to formally verify the non-inductive assertion under an assumption that the inductive assertion is valid.

15. The system of claim 9, wherein the one or more processors is further configured to, in response to the formal verification tool determining the non-inductive assertion is true for all valid states of the instantiation of the counter, provide the hardware design to an integrated circuit manufacturing system, which configures the integrated circuit manufacturing system to manufacture an integrated circuit implementing the counter.

16. A non-transitory computer readable storage medium having stored thereon computer readable code that when executed on a computer causes a method of correcting a bug in a counter of a hardware design to be performed, wherein the method comprises:
(a) receiving the hardware design, a test bench counter designed to simulate the counter, and an inductive assertion establishing a relationship between the counter and the test bench counter at two or more points in time;
(b) formally verifying, using a formal verification tool, the inductive assertion for the counter starting from a non-reset state of an instantiation of the counter;
(c) in response to the formal verification tool identifying at least one valid state of the instantiation of the counter in which the inductive assertion is not true, outputting information indicating a location of a bug in the hardware design or the test bench counter;
(d) if the output information indicates a location of a bug in the hardware design, receiving a modified hardware design, wherein the modified hardware design is a version of the hardware design modified to correct the bug in accordance with the output information; and
(e) formally verifying the modified hardware design for implementation in hardware.

17. A system for correcting a bug in a component of a hardware design, the system comprising:
a memory configured to store:
a test bench component designed to simulate the component of the hardware design;

an inductive assertion establishing a relationship between the component of the hardware design and the test bench component at two or more points in time;

the hardware design; and a formal verification tool; and one or more processors configured to:

formally verify, using the formal verification tool, the inductive assertion for the component;

in response to the formal verification tool identifying at least one valid state of an instantiation of the component in which the inductive assertion is not true, output information indicating a location of a bug in the hardware design or the test bench component; and if the output information indicates a location of a bug in the hardware design, receive a modified hardware design and formally verify the modified hardware design for implementation in hardware, wherein the modified hardware design is a version of the hardware design modified to correct the bug in accordance with the output information.

* * * * *